(12) United States Patent
Smith (10) Patent No.: US 9,835,123 B2
(45) Date of Patent: Dec. 5, 2017

(54) ROLLER FOR A FUEL PUMP ACTUATOR

(71) Applicant: ROLLER BEARING COMPANY OF AMERICA, INC., Oxford, CT (US)

(72) Inventor: Kelvin M. Smith, New Hartford, CT (US)

(73) Assignee: Roller Bearing Company of America, Inc., Oxford, CT (US)

( * ) Notice: Subject to any disclaimer, the term of this patent is extended or adjusted under 35 U.S.C. 154(b) by 0 days.

(21) Appl. No.: 14/993,620

(22) Filed: Jan. 12, 2016

(65) Prior Publication Data

US 2016/0201630 A1   Jul. 14, 2016

Related U.S. Application Data

(60) Provisional application No. 62/102,832, filed on Jan. 13, 2015.

(51) Int. Cl.
*F16H 53/06* (2006.01)
*F02M 59/04* (2006.01)
(Continued)

(52) U.S. Cl.
CPC .......... *F02M 59/102* (2013.01); *F02M 37/06* (2013.01); *F02M 59/44* (2013.01);
(Continued)

(58) Field of Classification Search
CPC ...... F02M 37/06; F02M 59/44; F02M 59/102; F04B 1/0417; F04B 1/0426; F16H 53/06;
(Continued)

(56) References Cited

U.S. PATENT DOCUMENTS 3,620,585 A * 11/1971 Anderson ............... F16C 19/26
384/491
3,667,822 A * 6/1972 Armstrong ............. F16C 19/26
384/565

(Continued)

FOREIGN PATENT DOCUMENTS

DE 102008042378 A1 4/2010
DE 102008043847 A1 5/2010
(Continued)

OTHER PUBLICATIONS

Extended European Search Report issued in corresponding European Application No. 16151075.5 dated Jun. 23, 2016, pp. 1-8.
(Continued)

*Primary Examiner* — Adam D Rogers
(74) *Attorney, Agent, or Firm* — Murtha Cullina LLP (57) ABSTRACT

A roller for a mechanical fuel pump assembly includes an elongate body extending from a first axial end to a second axial end of the elongate body over an overall length of the elongate body. The elongate body defines an effective length that is less than the overall length. The elongate body defines a uniform circular cross section over a second length of the elongate body. The second length is 75 to 90 percent of the effective length and the second length extends between a first plane and a second plane. A first area of reduced cross section extends axially outward from the first plane to a third plane located axially inward of the first axial end; and a second area of reduced cross section extends axially outward from the second plane to a fourth plane located axially inward of the second axial end.

12 Claims, 10 Drawing Sheets

(51) Int. Cl.
  *F01L 1/16*   (2006.01)
  *F02M 59/10*  (2006.01)
  *F02M 37/06*  (2006.01)
  *F04B 1/04*   (2006.01)
  *F02M 59/44*  (2006.01)

(52) U.S. Cl.
  CPC .......... *F04B 1/0417* (2013.01); *F04B 1/0426* (2013.01); *F16H 53/06* (2013.01); *F01L 1/16* (2013.01)

(58) Field of Classification Search
  CPC ........ F16H 53/08; F16C 33/36; F16C 33/366; F16C 2202/04; F16C 2223/16; F01L 1/14; F01L 1/16
  See application file for complete search history.

(56) References Cited

U.S. PATENT DOCUMENTS

| | | | | |
|---|---|---|---|---|
| 4,929,098 | A * | 5/1990 | Takata | F16C 23/086 384/450 |
| 5,052,822 | A | 10/1991 | Van Beek | |
| 6,227,711 | B1 * | 5/2001 | Kellstrom | F16C 33/36 384/450 |
| 6,354,745 | B1 * | 3/2002 | Ai | F16C 19/26 384/565 |
| 6,390,685 | B1 * | 5/2002 | Shimomura | F16C 19/26 384/450 |
| 6,843,605 | B2 * | 1/2005 | Tamada | F04B 27/1063 384/618 |
| 7,114,854 | B2 * | 10/2006 | Hayashi | F16C 19/305 384/623 |
| 7,311,087 | B2 | 12/2007 | Shaull et al. | |
| 7,568,461 | B1 | 8/2009 | Straub | |
| 9,200,626 | B2 * | 12/2015 | Park | F04B 17/05 |
| 2007/0071622 | A1 | 3/2007 | Schoeppe | |
| 2010/0037865 | A1 * | 2/2010 | Fuchs | F04B 1/0439 123/508 |
| 2010/0146964 | A1 | 6/2010 | Schmitt | |
| 2010/0163005 | A1 * | 7/2010 | Meier | F02M 59/102 123/495 |
| 2014/0033858 | A1 * | 2/2014 | Park | F16H 53/06 74/569 |
| 2015/0198229 | A1 | 7/2015 | Unes et al. | |
| 2015/0275834 | A1 | 10/2015 | Crofts et al. | |
| 2016/0160914 | A1 * | 6/2016 | Joki | F16C 33/34 384/568 |

FOREIGN PATENT DOCUMENTS

| | | |
|---|---|---|
| DE | 102009002520 A1 | 10/2010 |
| DE | 102009028373 A1 | 2/2011 |
| DE | 102010027792 A1 | 10/2011 |
| DE | 102010041178 A1 | 3/2012 |
| DE | 102011002745 A1 | 7/2012 |
| DE | 102012221765 A1 | 5/2014 |
| DE | 102013221196 A1 | 4/2015 |
| DE | 102013224797 A1 | 6/2015 |
| EP | 1717466 A2 | 11/2006 |
| EP | 2663772 B1 | 11/2014 |
| JP | 1223109 A | 8/1999 |
| JP | 2010001828 A | 1/2010 |
| WO | 2007107410 A | 9/2007 |
| WO | 2010130497 A1 | 11/2010 |
| WO | 2011128151 A1 | 10/2011 |
| WO | 2012100854 A1 | 8/2012 |

OTHER PUBLICATIONS

Fujiwara et al., Logarithmic Profiles of Rollers in Roller Bearings and Optimization of the Profiles, NTN Technical Review No. 75 (2007), pp. 140-148.

* cited by examiner

ROLLER FOR A FUEL PUMP ACTUATOR

CROSS REFERENCE TO RELATED APPLICATIONS

This patent application claims the benefit of U.S. Provisional Patent Application Ser. No. 62/102,832, filed on Jan. 13, 2015, which is hereby incorporated by reference in its entirety.

FIELD OF THE INVENTION

This invention relates to a roller for a fuel pump actuator and more particularly to a profile for a roller that optimizes hydrodynamic and rolling performance of the roller.

BACKGROUND

Figure 1A:
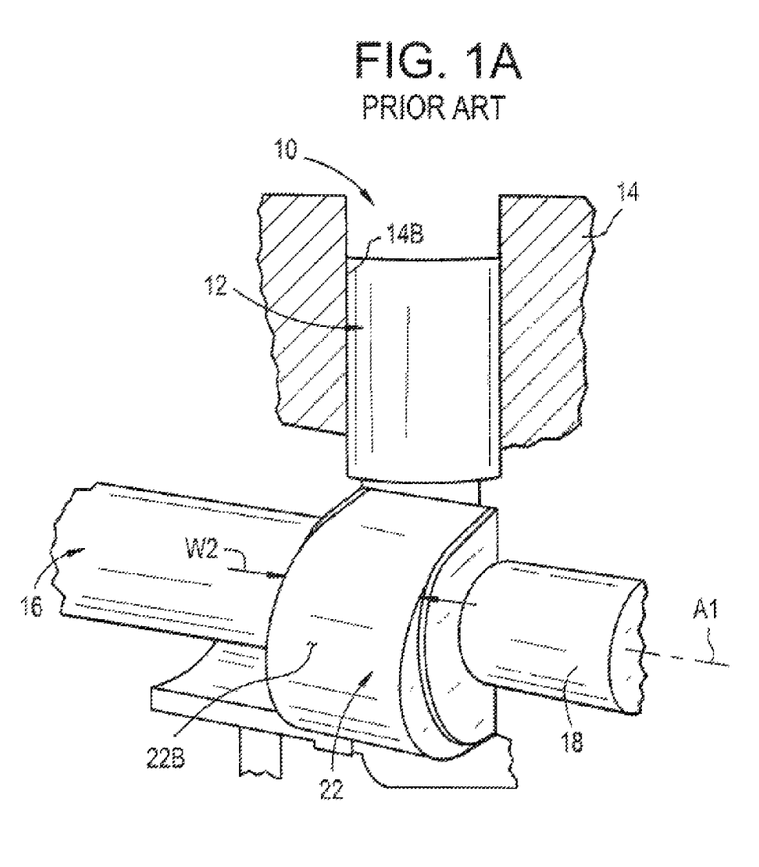
FIG. 1A is a cut away perspective view of a prior art mechanical fuel pump assembly.

Internal combustion engines use fuel pumps for delivery of fuel to combustion chambers of the engine. Fuel pumps include mechanical and electrical types. As shown in FIG. 1A, a mechanical fuel pump 10 includes a pump actuator 12 disposed in a housing 14. The fuel pump 10 includes a cam assembly 16 rotatably positioned in the housing 14 in proximity to the pump actuator 12. The cam assembly 16 includes a cam 22 mounted on a cam shaft 18. The cam 22 defines a cam surface 22B.

Figure 1B:
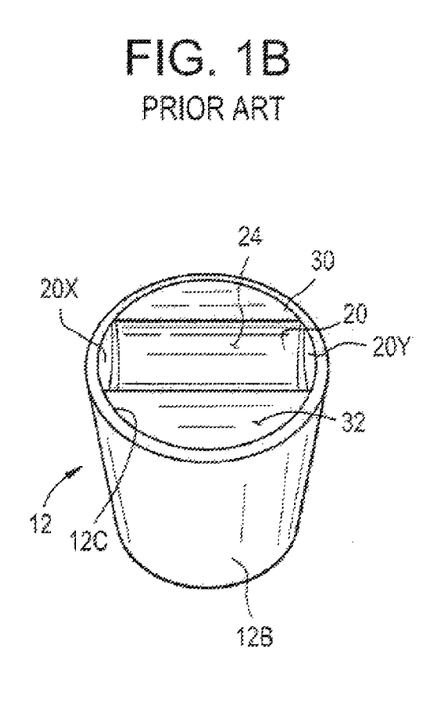
FIG. 1B is a bottom perspective view of the pump actuator of the fuel pump assembly of FIG. 1A.

As shown in FIG. 1B, the pump actuator 12 defines a substantially cylindrical body 12B that has an interior surface 12C. A shoe 30 having a circumferential face 30C is press fit into the interior surface 12C. The actuator 12 slides (e.g., up and down or in and out) of a bore 14B defined by the housing 14. The cam 22 has an axial width W2. The shoe 30 has an arcuate (e.g., circular contour) seating surface 34 extending diametrically across the shoe 30. The seating surface 34 is open a width W1 at an axial face 32. The arcuate seating surface 34 extends axially into the shoe 30 a depth D1, from the axial face 32 of the shoe 30. A roller 20 is rotatably disposed on the seating surface 34 so that a portion of the roller 20 extends outwardly from the axial face 32 of the shoe 30. The roller 20 has a diameter D2 that is greater than the depth D1. In one embodiment, the width W1 (in this particular case shown) is less than the roller diameter D1, such that the roller 20 has to be inserted axially and cannot fall out radially. This eases assembly/disassembly and avoids the roller 20 falling out should the roller leave the cam during operation. The roller 20 defines a cylindrical exterior surface 24 that extends an overall length LX from a first axial end 20X to a second axial end 20Y of the roller 20.

Figure 3:
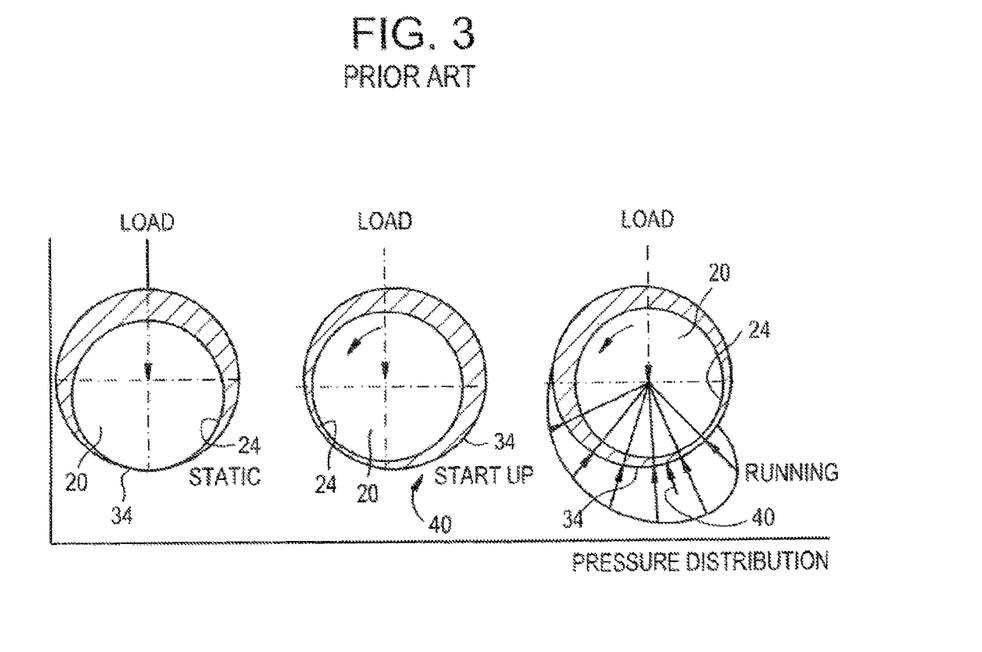
FIG. 3 is a schematic view of hydro-dynamic wedging of the roller in the shoe of FIGS. 1A, 1B and 2, showing static, start-up and running conditions.

The exterior surface 24 of the roller 20 is rotatable relative to the seating surface 34 of the shoe 30. In particular, the exterior surface 24 rotates hydro-dynamically on a hydraulic wedge of lubricant 40 in the seating surface 34 of the shoe 30, as shown in FIG. 3. The wedge 40 lifts the roller 20 away from the shoe 30 so that during operation, there is negligible contact between the exterior surface 24 and the seating surface 34. However, to achieve adequate hydro-dynamic wedging and lift, an adequate length of roller is required.

Figure 4:
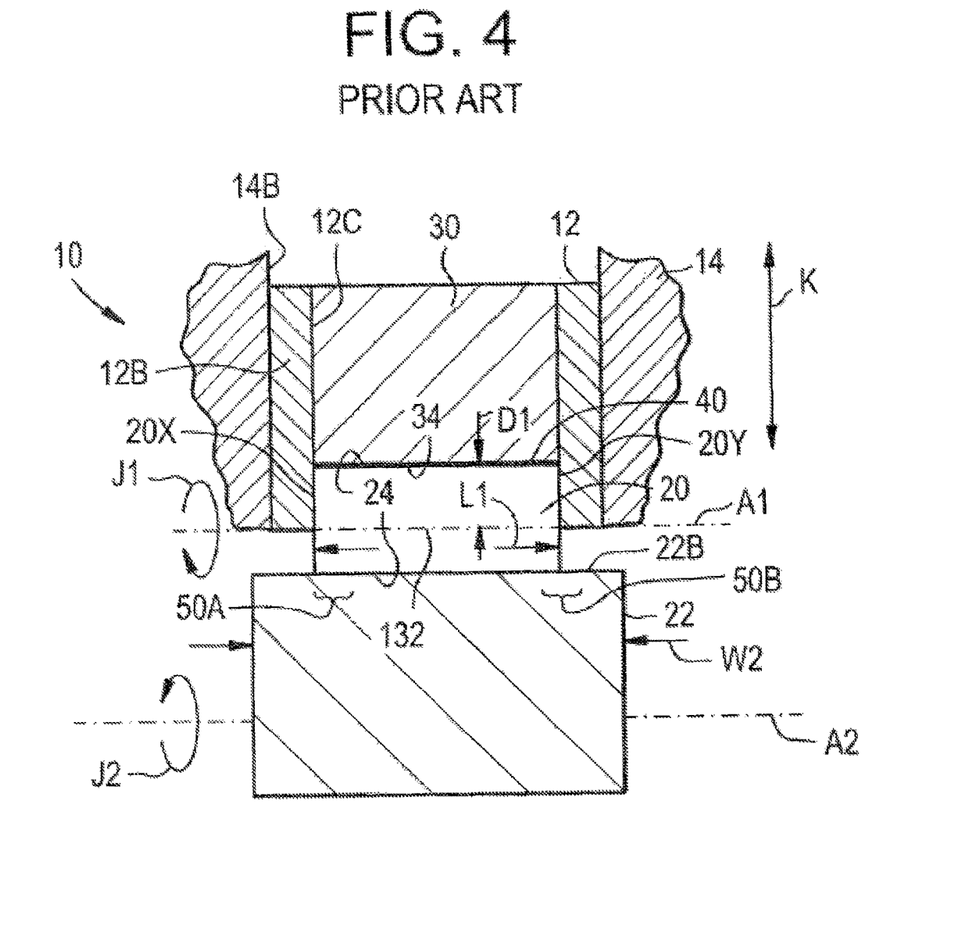
FIG. 4 is a cross sectional view of a portion of the fuel pump of FIG. 1A.

As shown in FIG. 4, the exterior surface 24 of the roller 20 rotates in the seating surface 34 of the shoe 30 about an axis A1 in a direction indicated by the arrow J1, while the roller 20 translates in the shoe 30 in a direction indicated by the arrow K. The exterior surface 24 of the roller 20 rolls on the cam surface 22B as the cam 22 rotates around an axis A2 in the direction indicated by an arrow J2, which is opposite to the direction J1. As a result of the rolling of the exterior surface 24 of the roller 20 on the cam surface 22B, edge portions 50A and 50B of the exterior surface 24, proximate the axial end 20X and 20Y, respectively are subject to high contact pressures and subsequent subsurface stresses in the material and tend to fail prematurely. The graph 500 of FIG. 5 indicates peak contact pressures at planes 501 and 502 of the roller 20, proximate the first axial end 20X to a second axial end 20Y of the roller 20. The peak contact pressures at planes 501 and 502 is about 140 percent of the contact pressure at an intermediate plane 503 of the roller 20. Attempts to reduce the high stress in the edge portions 50A and 50B have been undermined by the contrary need to maximize the overall length LX of the roller 20 to achieve adequate hydro-dynamic wedging and lift. In addition, efforts to maximize the length of the roller 20 to achieve adequate hydro-dynamic wedging and lift has worsened the stress in the end portions 50A and 50B.

Based on the foregoing, it is the general object of this invention to provide a roller and roller profile that optimize hydro-dynamic wedging and lift, and reduces stress on the end portions 50A and 50B of the roller/cam contact.

SUMMARY OF THE INVENTION

A roller for a mechanical fuel pump assembly includes an elongate body extending from a first axial end to a second axial end of the elongate body over an overall length of the elongate body. The elongate body defines an effective length that is less than the overall length. The elongate body defines a uniform circular cross section over a second length of the elongate body. The second length is 75 to 90 percent of the effective length and the second length extends between a first plane and a second plane. A first area of reduced cross section extends axially outward from the first plane to a third plane located axially inward of the first axial end; and a second area of reduced cross section extends axially outward from the second plane to a fourth plane located axially inward of the second axial end.

In one embodiment, the first area of reduced cross section and/or the second area of reduced cross section has a profile having one or more radii of curvature. The radius of curvature is configured to relieve contact pressure proximate at least one of the first axial end and the second axial end.

DETAILED DESCRIPTION OF THE INVENTION

Figure 2:
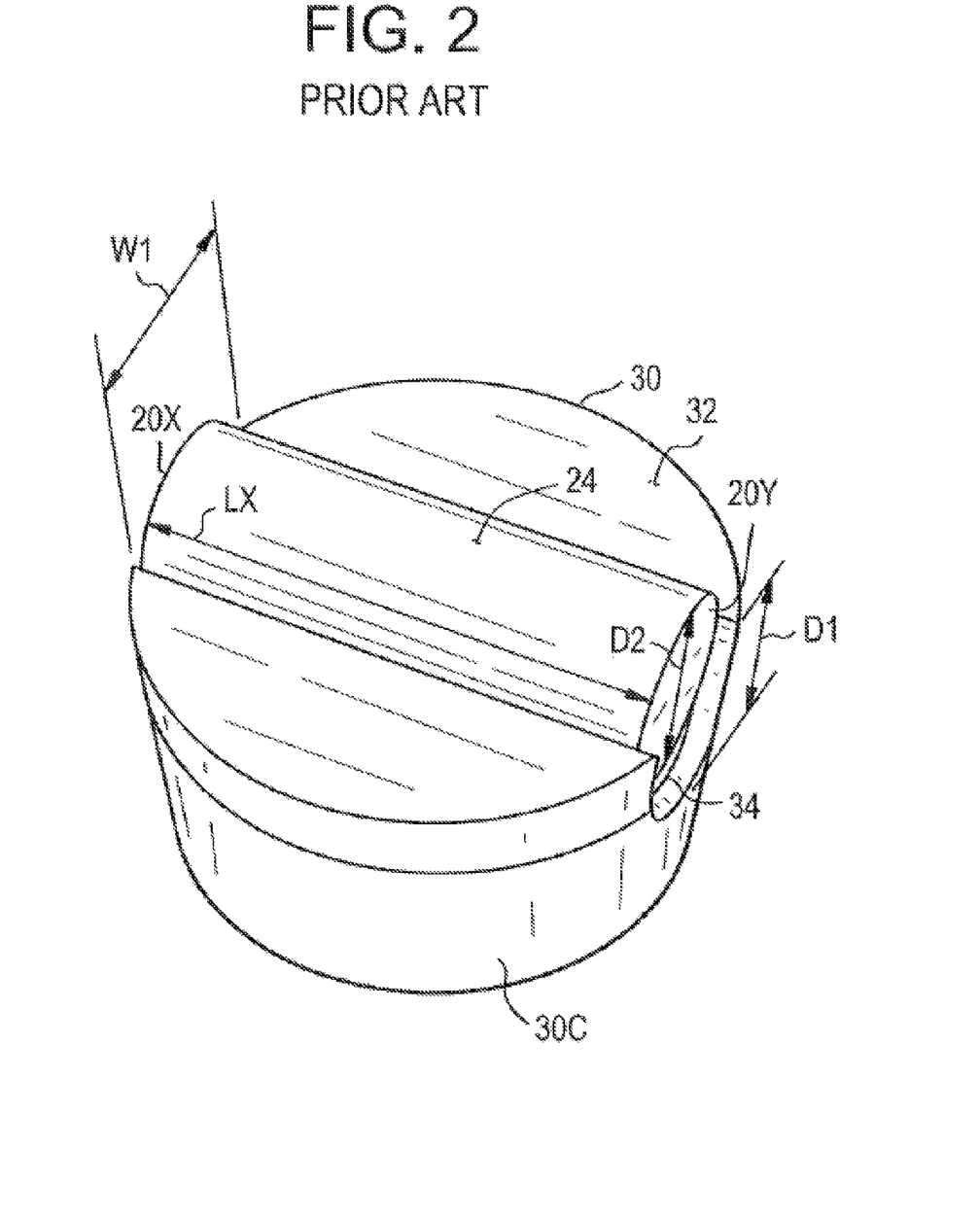
FIG. 2 is a perspective view of the roller and shoe portion of the pump actuator of FIG. 1B.
Figure 6A:
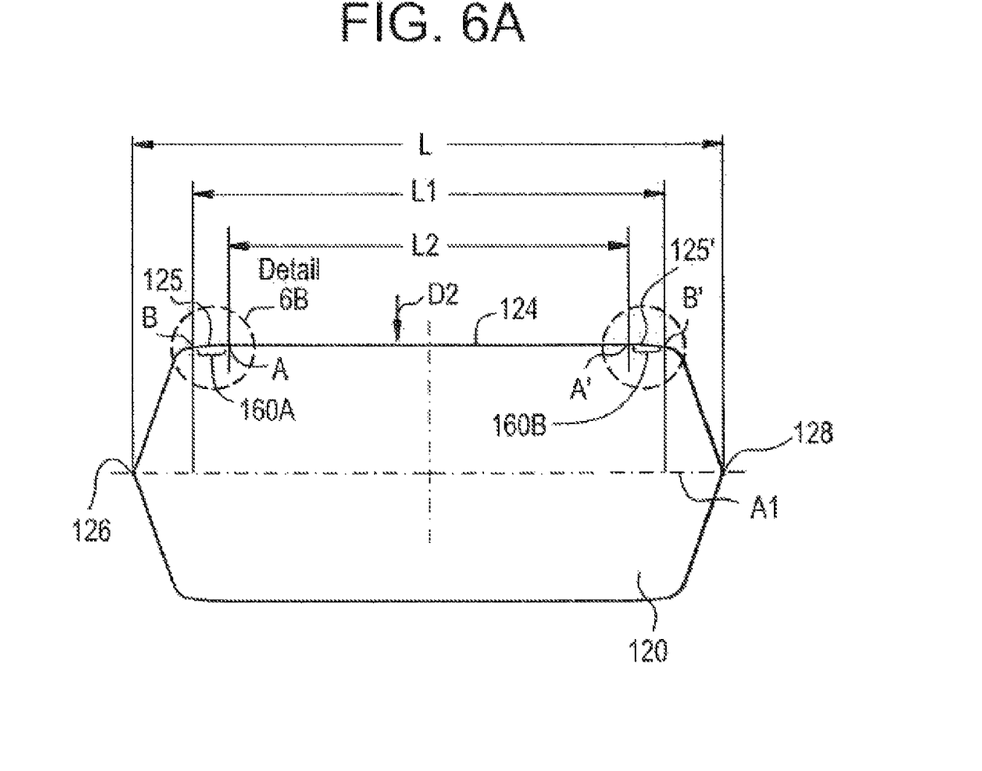
FIG. 6A is a cross sectional view of a roller of the present invention.
Figure 7:
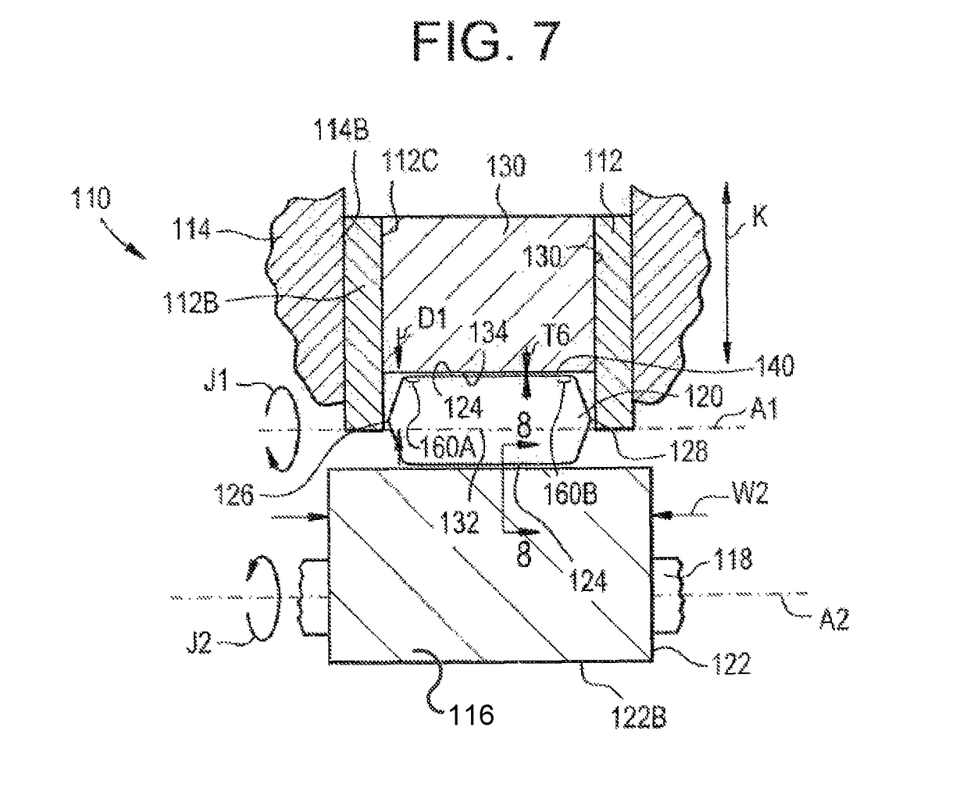
FIG. 7 is a cross sectional view of a fuel pump having the roller of FIG. 5 disposed therein.

Referring to FIG. 7, a mechanical fuel pump 110 is similar to the mechanical fuel pump 10 of FIGS. 1A, 1B and 2, thus similar elements are designated with similar element numbers preceded by the numeral 1. The mechanical fuel pump 110 includes a pump actuator 112 disposed in a housing 114. The fuel pump 110 includes a cam assembly 116 rotatably positioned in the housing 114 in proximity to the pump actuator 112. The cam assembly 116 includes a cam 122 mounted on a cam shaft 118. The cam 122 defines a cam surface 122B. The pump actuator 112 defines a substantially cylindrical body 112B having an interior surface 112C. A shoe 130 is pressed into in an interior defined by the interior surface 112C. The shoe 130 is pressed into the pump actuator body. The cam 122 has an axial width W2. The shoe 130 has an arcuate (e.g., circular contour) seating surface 134 extending diametrically across the shoe 130. The seating surface 134 is open a width W1 at the axial face 132. The arcuate seating surface 134 extends axially into the shoe 130 a depth D1 from the axial face 132 of the shoe 130. A roller 120 is rotatably disposed on the seating surface 134 so that a portion of the roller 120 extends outwardly from the axial face 132 of the shoe 130. The roller 120 has a diameter D2 (see FIG. 6A) that is greater than the depth D1. The width W1 is about equal to or slightly greater than the diameter D2. A portion of the exterior surface of the roller 120 is an exterior cylindrical surface 124 as described herein.

The exterior cylindrical surface 124 of the roller 120 is rotatable relative to the seating surface 134 of the shoe 130. In particular, the exterior cylindrical surface 124 rotates hydro-dynamically on a hydraulic wedge of lubricant 140 in the seating surface 134 of the shoe 130, as shown in FIG. 7 and similar to the wedge of lubricant 40 illustrated in FIG. 3. The wedge 140 lifts the roller 120 away from the shoe 130 so that during operation, there is negligible contact between the exterior cylindrical surface 124 and the seating surface 134. To achieve adequate hydro-dynamic wedging and lift, an adequate length of roller is required.

As shown in FIG. 7, the exterior cylindrical surface 124 of the roller 120 rotates in the seating surface 134 of the shoe 130 about an axis A1 in a direction indicated by the arrow J1, while the roller 120 translates in the shoe 130 in a direction indicated by the arrow K. The exterior cylindrical surface 124 of the roller 120 rolls on the cam surface 122B as the cam 122 rotates around an axis A2 in the direction indicated by an arrow J2, which is opposite to the direction J1.

As shown in FIGS. 6A and 7, the roller 120 for the mechanical fuel pump assembly 110, defines an elongate body 120 having an overall length L extending from a first axial end 126 to a second axial end 128 of the elongate body 120. The elongate body 120 defines a first length L1, also referred to herein as an effective length L1, that extends from plane B to plane B'. The elongate body 120 defines a uniform circular cross section (i.e., cylindrical) over a second length L2 of the elongate body 120 that extends from plane A to plane A'. The second length L2 is 75 to 90 percent of the effective length L1 and the second length L2. The second length L2 is spaced apart from each of the plane B and plane B' by distance having a magnitude of about 5 percent to 12.5 percent of the effective length L1. In one embodiment, the second length L2 is 75 percent to 80 percent of the effective length L1. In one embodiment, the second length L2 is spaced apart from each of the plane B and plane B' by distance having a magnitude of about 10 percent to 12.5 percent of the effective length L1. The inventors have discovered that establishing the length L2 between 75 and 90 percent of the effective length L1 has unexpectedly yielded an optimization between hydro-dynamic wedging and lift, and a stress reduction proximate ends of the elongate body 120 (i.e., roller).

Figure 5:
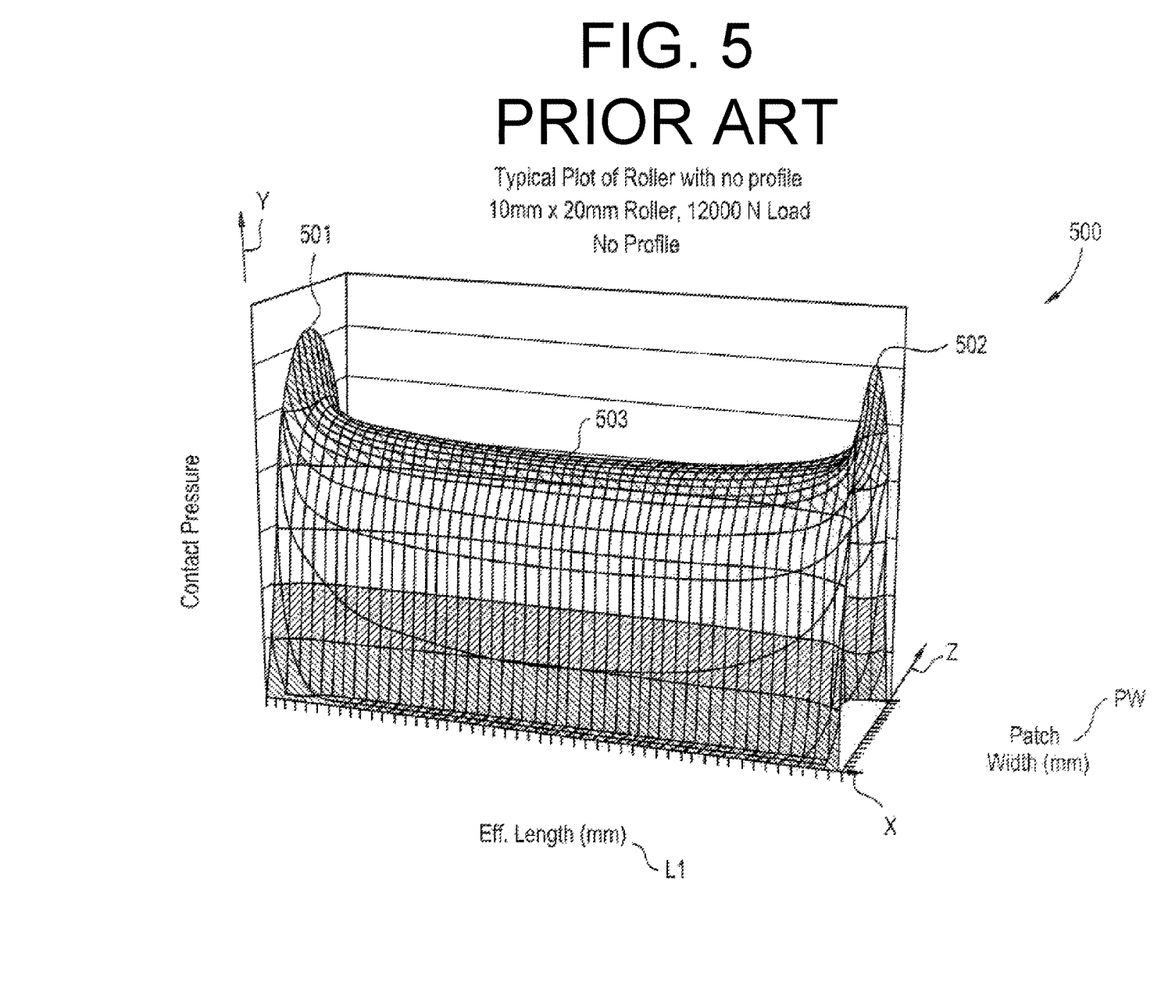
FIG. 5 is a graph of contact pressure versus roller length and patch width of a standard roller with no profile.
Figure 8:
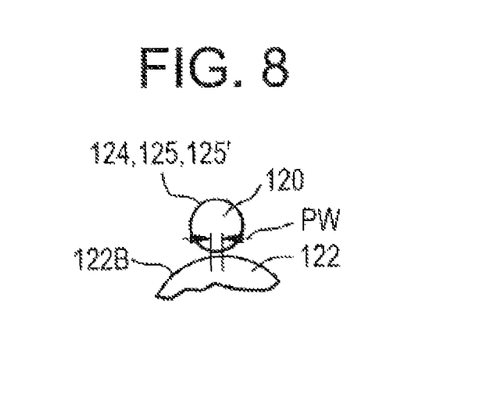
FIG. 8 is a partial cross sectional view of a portion of the roller and cam of FIG. 7 illustrating patch width.
Figure 10:
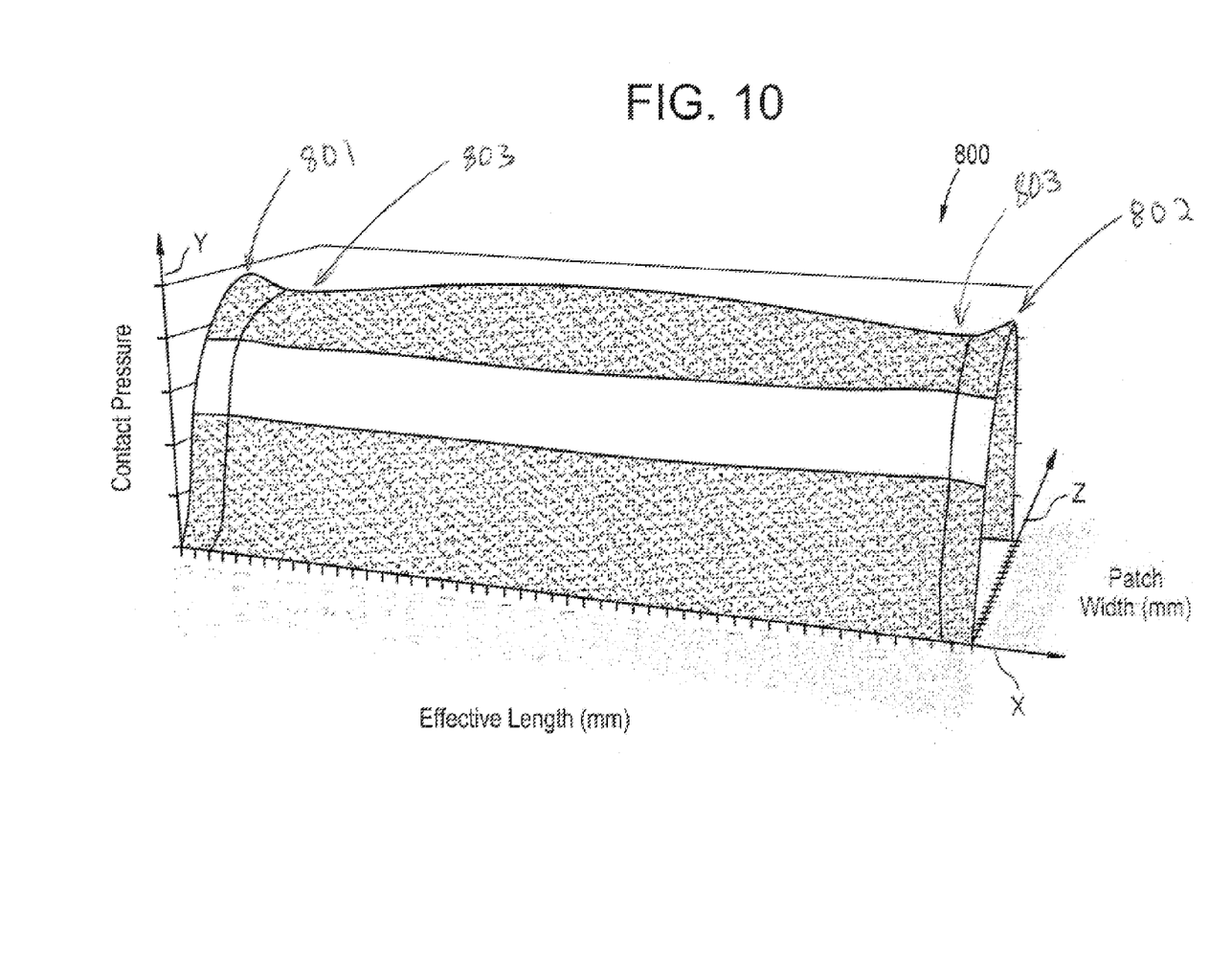
FIG. 10 is a cross sectional view of another embodiment of the roller of the present invention illustrated with a 90 percent straight cylindrical section.

Via analysis and testing the inventors have demonstrated unacceptable levels of stress proximate the ends 126 and 128 of the roller 120 when the second length L2 is greater than 90%, and demonstrated inadequate hydro-dynamic wedging and lift when the second length L2 is less than 75% of the first length L1. For example, the inventors conducted a contact pressure analysis of a roller with a constant cylindrical profile and plotted the results in a graph 500 as illustrated in FIG. 5. The graph 500 shows contact pressure on a Y-axis, effective length L of the roller 20 on an X-axis and patch width PW on a Z-axis. As shown in FIG. 8, the patch width PW is defined as the width of the contact area between the exterior cylindrical surface 124 or the profiled exterior surfaces 125 and 125' as shown in FIG. 6A and the cam surface 122B. The graph 500 of FIG. 5 indicates peak contact pressures at planes 501 and 502 of the roller 20, proximate the first axial end 20X to a second axial end 20Y of the roller 20. The peak contact pressures at planes 501 and 502 is about 140 percent of the contact pressure at an intermediate plane 503 of the roller 20. In addition, analysis of a roller having L2 at a magnitude of about 95% of the effective length L1 demonstrated contact pressures. For example, the graph 800 of FIG. 10 is for a roller having a straight length L2 having a magnitude of 95% of the effective length L1. The graph 800 indicates contact pressures at planes 801 and 802 proximate the first axial end 20X to a second axial end 20Y of the roller 20 that lead to permanent deformation of the cam surface as well as to high subsurface stress in the cam material, and ultimately to spalling of the cam. The peak contact pressures at planes 801 and 802 is about 118 percent of the contact pressure at intermediate planes 803 of the roller.

Figure 6B:
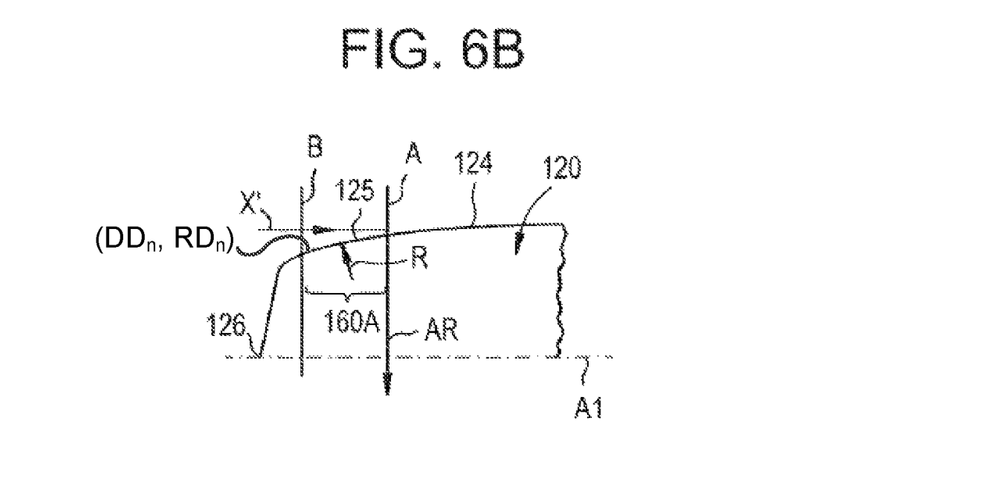
FIG. 6B is an enlarged view of detail 6B of FIG. 6A illustrating a roller profile.

Still referring to FIGS. 6a and 7, the elongate body 120 defines a first area of reduced cross section 160A extending axially outward from the plane A to the plane B; and a second area of reduced cross section 160B extending axially outward from the plane A' to the plane B'. As best shown in FIG. 6B, the first area of reduced cross section 160A and/or the second area of reduced cross section 160B include a profile having one or more radii of curvature R. In one embodiment, the radius of curvature R is configured to relieve contact stress proximate at least one of the first axial end 126 and the second axial end 128 and in particular on a surface 125 between the plane A and the plane B and on a surface 125' between the plane A' and the plane B'. A shown in FIG. 6B, one profile of the area of reduced cross section 160A is defined by a locust of points $(DD_n, RD_n)$, The distance $DD_n$ is defined axially inward from plane B in the direction of the arrow X'; and the drop $RD_n$ is defined radially inward from the exterior cylindrical surface 124 in the direction of the arrow AR.

The uniform circular cross section over a second length L2 defines a exterior cylindrical surface 124 having surface finish and profile waviness heights of a magnitude less than that of a hydro-dynamic lubrication film 140 thickness T6 formed on the exterior cylindrical surface 124. In one embodiment, the roller 120 is manufactured from a SAE 52100 steel. The roller 120 has a surface hardening (e.g., carbo-nitrided surface) of at least 65 Rockwell C scale. The surface hardening (e.g., carbo-nitrided surface) is about 0.5 mm deep.

Figure 9:
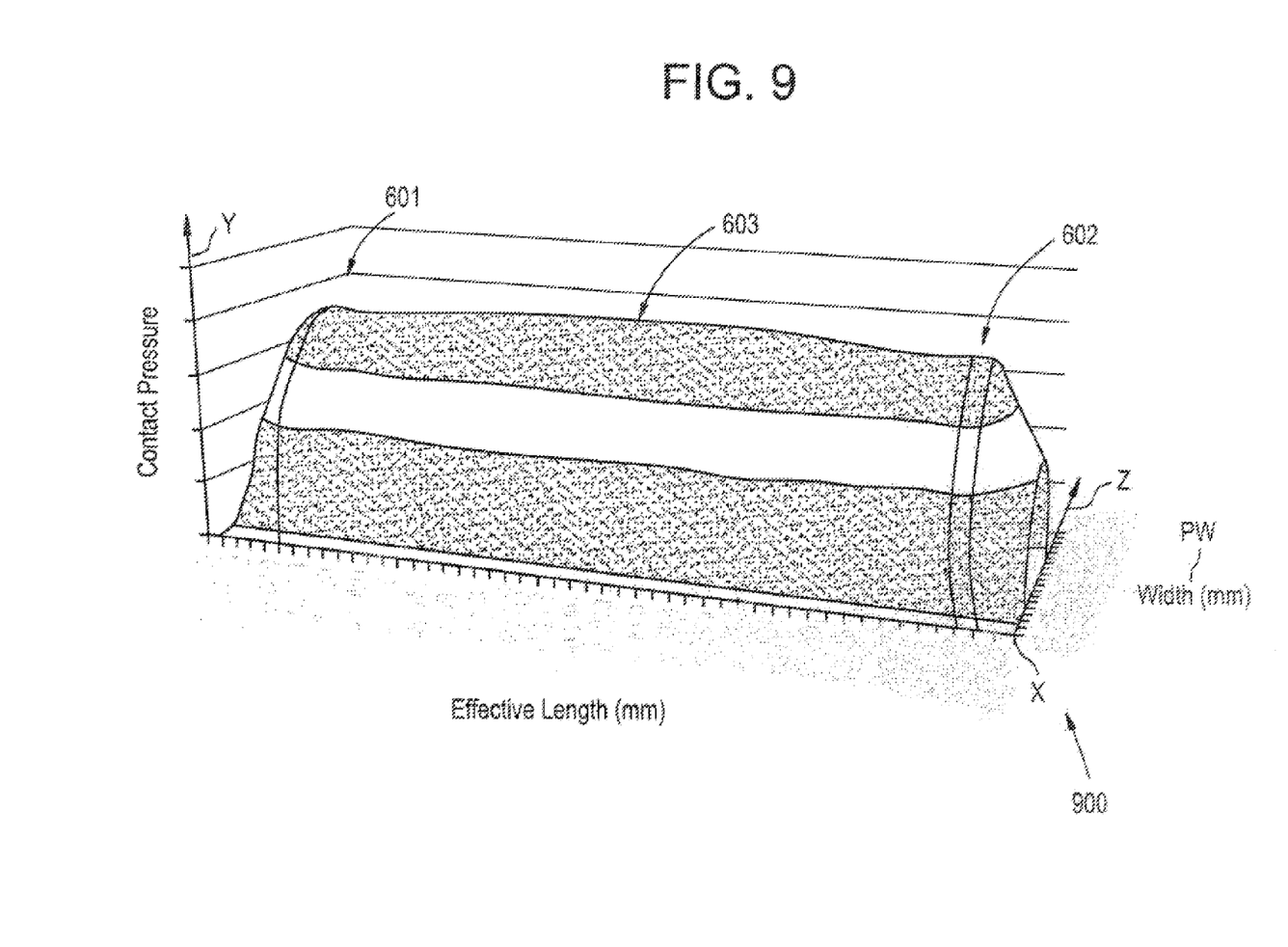
FIG. 9 is a graph of contact pressure versus roller length and patch width of the roller having the profile of FIG. 6.

As shown in FIG. 9, a graph 900 shows contact pressure on a Y-axis, effective length L of the roller 120 on an X-axis and patch width PW on a Z-axis, for one of the rollers 120 of the present invention as defined herein and as shown for example in FIG. 6A. The graph 900 illustrates that contact pressures at areas 601 and 602 proximate the first axial end 126 and the second axial end 128 of the roller 120 are less than contact pressures at intermediate points such as 603.

Figure 11:
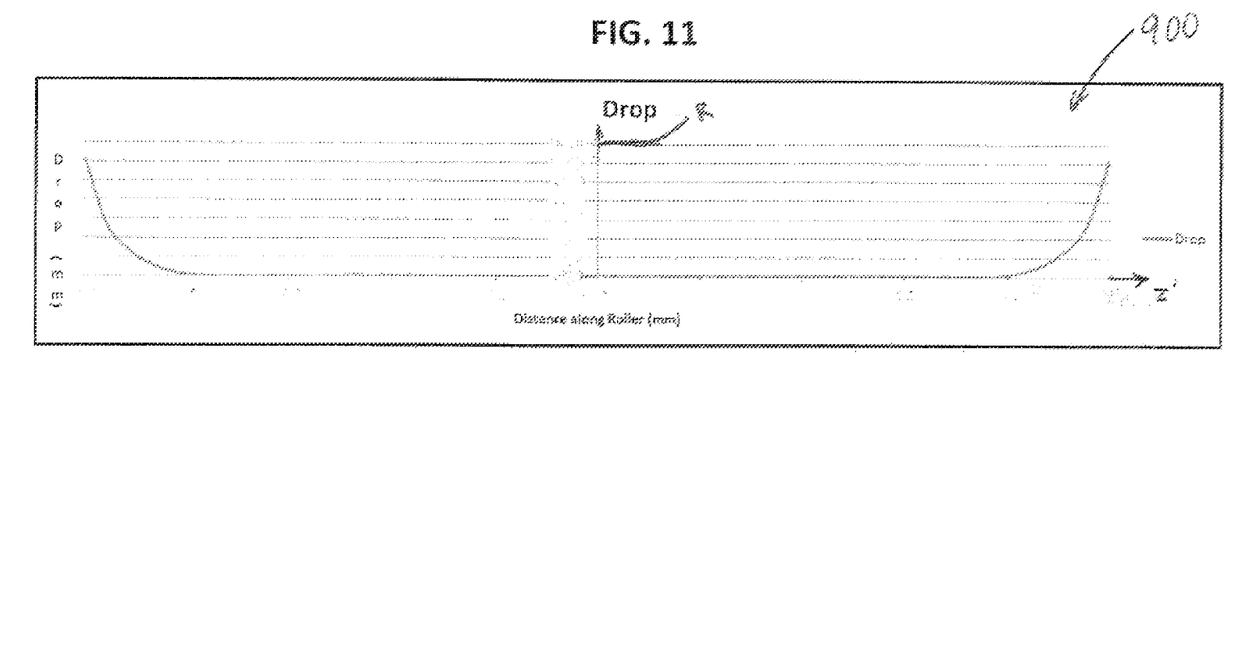
FIG. 11 is graph of a profile for a roller having a logarithmic profile on the ends thereof.

As shown in FIG. 11, in one embodiment, the first area of reduced cross section 160A and/or the second area of reduced cross section 160B have a logarithmic profile. As shown in graph 900 of FIG. 11 and Table 2 below, the logarithmic profile is defined by the formula:

$$\text{Drop} = \left(\frac{A}{Z}\right) \ln\left[\frac{1}{\left(1 - \left(\frac{2x - \text{cyl\_len}}{Z}\right)^2\right)}\right]$$

Drop is the radial roller drop on the axis R, A is a constant based on the application and roller parameters, Z is the total length of the profiled area of the roller along axis Z', Cyl_len is the cylindrical length of the roller and x is the axial position along the roller from the center along the axis Z'.

Although the invention has been described with reference to particular embodiments thereof, it will be understood by one of ordinary skill in the art, upon a reading and understanding of the foregoing disclosure that numerous variations and alterations to the disclosed embodiments will fall within the spirit and scope of this invention and of the appended claims.

What is claimed is:

1. A roller for a mechanical fuel pump assembly, the roller comprising:
an elongate body extending from a first axial end to a second axial end of the elongate body over an overall length of the elongate body, the elongate body defining a first length that is less than the overall length;
the elongate body defining a uniform circular cross section over a second length of the elongate body, the second length being 75 to 90 percent of the first length and having the uniform circular cross section to obtain hydro-dynamic wedging and lift of the elongate body and the second length extending between a first plane and a second plane and the first length extending between a third plane and a fourth plane;
a first area of reduced cross section extending axially outward from the first plane to the third plane located axially inward of the first axial end; and
a second area of reduced cross section extending axially outward from the second plane to the fourth plane located axially inward of the second axial end.

2. The roller of claim 1, wherein at least one of the first area of reduced cross section and the second area of reduced cross section comprises a profile having at least one radius of curvature.

3. The roller of claim 2, wherein the at least one radius of curvature is configured to relieve contact stress proximate at least one of the first axial end and the second axial end.

4. The roller of claim 1, wherein the second length is spaced apart from each of the third plane and the fourth plane by a distance having a magnitude of 5 percent to 12.5 percent of the first length.

5. The roller of claim 1, wherein the second length is 75 percent to 80 percent of the first length.

6. The roller of claim 5, wherein the second length is spaced apart from each of the third plane and the fourth plane by a distance having a magnitude of 10 percent to 12.5 percent of the first length.

7. The roller of claim 6, wherein a carbo-nitride surface hardening of the roller is 0.5 mm deep.

8. The roller of claim 1, wherein the uniform circular cross section over the second length defines an exterior cylindrical surface having a surface finish and profile waviness heights having a height equal to or less than that of a hydro-dynamic lubrication film thickness formed on the cylindrical surface.

9. The roller of claim 1, wherein the roller comprises SAE 52100 steel.

10. The roller of claim 9, wherein the roller has a surface hardening of at least 65 Rockwell C scale.

11. The roller of claim 10, wherein the surface hardening is carbo-nitriding.

12. The roller of claim 1, further comprising a logarithmic profile proximate at least one of the first axial end and the second axial end.

* * * * *